United States Patent
Oya et al.

(10) Patent No.: US 8,339,707 B2
(45) Date of Patent: Dec. 25, 2012

(54) ANTI-REFLECTION MULTI-LAYER LAMINATED FILM

(75) Inventors: Taro Oya, Gifu (JP); Masato Asai, Gifu (JP)

(73) Assignee: Teijin Dupont Films Japan Limited, Tokyo (JP)

(*) Notice: Subject to any disclaimer, the term of this patent is extended or adjusted under 35 U.S.C. 154(b) by 850 days.

(21) Appl. No.: 10/592,318

(22) PCT Filed: Mar. 10, 2005

(86) PCT No.: PCT/JP2005/004704
§ 371 (c)(1),
(2), (4) Date: Sep. 11, 2006

(87) PCT Pub. No.: WO2005/088363
PCT Pub. Date: Sep. 22, 2005

(65) Prior Publication Data
US 2007/0195412 A1 Aug. 23, 2007

(30) Foreign Application Priority Data
Mar. 11, 2004 (JP) .................... 2004-068749
Mar. 11, 2004 (JP) .................... 2004-068750

(51) Int. Cl.
G02B 27/28 (2006.01)
C09K 19/00 (2006.01)
G02F 1/1335 (2006.01)

(52) U.S. Cl. ............ 359/487.05; 428/1.3; 349/96

(58) Field of Classification Search ............ 349/119; 359/586, 360, 582; 313/478, 479; 428/428, 428/212, 215; 156/379.8
See application file for complete search history.

(56) References Cited

U.S. PATENT DOCUMENTS

| | | | |
|---|---|---|---|
| 6,583,930 B1 | 6/2003 | Schrenk et al. | |
| 6,677,031 B1 * | 1/2004 | Murooka et al. | 428/212 |
| 2002/0031676 A1 * | 3/2002 | Jonza et al. | 428/480 |
| 2002/0154406 A1 * | 10/2002 | Merrill et al. | 359/498 |

FOREIGN PATENT DOCUMENTS

| | | |
|---|---|---|
| JP | 04-268505 A | 9/1992 |
| JP | 6-230201 A | 8/1994 |
| JP | 06-230201 A | 8/1994 |
| JP | 07-110401 A | 4/1995 |
| JP | 7-110401 A | 4/1995 |
| JP | 7-168004 A | 7/1995 |
| JP | 07-168004 A | 7/1995 |
| JP | 8-286034 A | 11/1996 |
| JP | 08-286034 A | 11/1996 |
| JP | 09-506837 A | 7/1997 |
| JP | 10-511322 A | 11/1998 |
| JP | 11-6902 A | 1/1999 |

(Continued)

*Primary Examiner* — Angela Ortiz
*Assistant Examiner* — Anthony J Frost
(74) *Attorney, Agent, or Firm* — Sughrue Mion, PLLC

(57) ABSTRACT

A laminated film obtained by carrying out anti-reflection processing on the surface of a reflection polarizing film. This laminated film comprising (A) a monoaxially oriented laminated film consisting of 501 or more alternating first layers made of a first thermoplastic resin having a positive stress optical coefficient and a thickness of 0.05 to 0.5 μm and second layers made of a second thermoplastic resin different from the first thermoplastic resin and having a thickness of 0.05 to 0.5 μm, and a low-reflectance layer formed on at least one side of the monoaxially oriented laminated film and having a reflectance of the surface measured from the input side of 3% or less.

7 Claims, 1 Drawing Sheet

FOREIGN PATENT DOCUMENTS

| | | |
|---|---|---|
| JP | 2001-051121 A | 2/2001 |
| JP | 2001-51121 A | 2/2001 |
| JP | 2003-292805 A | 10/2003 |
| JP | 2003-337202 A | 11/2003 |
| WO | WO 01/47711 A | 7/2001 |
| WO | WO 01/47711 A1 | 7/2001 |

* cited by examiner

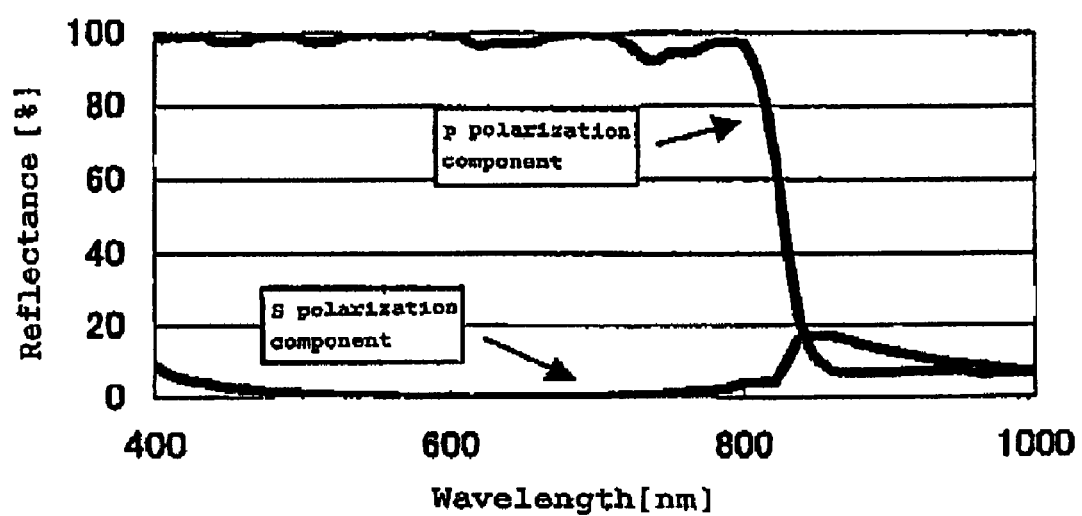

ANTI-REFLECTION MULTI-LAYER LAMINATED FILM

TECHNICAL FIELD

The present invention relates to a monoaxially oriented multi-layer laminated film for use in a reflection type polarizing plate, comprising (1) a monoaxially oriented laminated film which consists of alternating low-refractive index layers and high-refractive index layers and which selectively reflects light having a desired wavelength range according to a difference in refractive index for a specific polarization component between these layers and the thickness of each layer by controlling the refractive indices of the low-refractive index layers and the high-refractive index layers by stretching and (2) an anti-reflection film formed on one side or both sides of the film and to a brightness improving film for liquid crystal displays.

BACKGROUND ART

A multi-layer laminated film consists of alternating low-refractive index layers and high-refractive index layers and can be used as an optical interference film which selectively reflects or transmits light having a specific wavelength by structural optical interference between these layers. When this multi-layer laminated film is changed in layer thickness gradually or assembled with a film having a different reflection peak, it can achieve a reflectance as high as that of a film made of a metal and can be used as a metal glossy film or reflection mirror. Further, it is known that when this multi-layer laminated film is stretched in only one direction, it can be used as a polarization reflection film which reflects only a specific polarization component and also that when this stretched film is used in a liquid crystal display, it can be used as a brightness improving film for liquid crystal displays.

In general, a phenomenon such as "increased reflection" that light having a specific wavelength is reflected according to a difference in refractive index between two layers, the thickness of each layer and the number of layers is seen in a multi-layer optical film consisting of layers having a thickness of 0.05 to 0.5 μm and different refractive indices. The reflection wavelength is generally represented by the following equation (1).

$$\lambda = 2x((n1) \times (d1) + (n2) \times (d2)) \quad (1)$$

wherein λ is a reflection wavelength (nm), n1 and n2 are the refractive indices of the respective layers, and d1 and d2 are thicknesses of the respective layers (nm).

As shown in JP-A 04-268505, when a resin having a positive stress optical coefficient is used in one layer, anisotropy is provided to birefringence by monoaxial orientation, thereby making it possible to reflect only a specific polarization component. Making use of this principle, for example, a reflection polarizing film which reflects P polarization and transmits S polarization can be designed. The desired birefringence is represented by the following expression (2).

$$n1x > n2x, n1y = n2y \quad (2)$$

wherein n1x and n2x are the refractive indices in the stretching direction of the respective layers, and n1y and n2y are the refractive indices in the direction perpendicular to the stretching direction of the respective layers.

JP-A 9-506837 and WO01/47711 disclose a biaxially oriented film consisting of high-refractive index layers made of polyethylene-2,6-naphthalene dicarboxylate (may be abbreviated as "PEN" hereinafter) and low-refractive index layers made of a thermoplastic elastomer and a monoaxially oriented multi-layer laminated film consisting of high-refractive index layers made of PEN and low-refractive index layers made of PEN comprising 30 mol % of isophthalic acid. These films are reflection polarizing films which reflect only specific polarization by using a resin having a positive stress optical coefficient in one type of layers and a resin having an extremely small stress optical coefficient, that is, a resin that rarely exhibits birefringence by stretching in the other type of layers. These reflection polarizing films can be used as a brightness improving film for liquid crystal displays.

In general, when the reflection polarizing film composed of a monoaxially oriented multi-layer laminated film is used as a brightness improving film for liquid crystal displays, it is desired that the visible light reflectance of P polarization which is a polarization component parallel to the plane including the stretching direction and a direction perpendicular to the film plane be close to 100% and that of S polarization which is a polarization component perpendicular to the above plane be close to 0%. Although the conventional reflection polarizing film can achieve a reflectance for P polarization with respect to the above plane of 90% or more, it has a reflectance for S polarization of about 10 to 15%. Therefore, a reduction in brightness is caused by a reflection loss in the liquid crystal display.

The above reflection polarizing film composed of a monoaxially oriented multi-layer laminated film has a visible light reflectance of S polarization with respect to the plane based on the stretching direction and the perpendicular direction of about 10 to 15%. This is mainly due to interfacial reflection caused by a difference in refractive index between a film substrate and air. To reduce the interfacial reflection, anti-reflection processing is employed.

As for anti-reflection coating used for displays, since the reflectance of the whole visible range cannot be reduced only with one coating layer, two coating layers consisting of a high-refractive index layer and a low-refractive index layer or three coating layers consisting of intermediate-refractive index layer, high-refractive index layer and low-refractive index layer are formed on the substrate.

Techniques for forming the above anti-reflection film are divided into a wet coating technique in which a solution is coated on a film and dried and this is repeated to form multiple layers and a dry coating technique in which sputtering/deposition is repeated. The former has a production problem that it is difficult to form multiple layers having a desired thickness accurately and the latter also has production problems that the production costs are high due to the use of a vacuum and that productivity is low though it has high accuracy.

For the above reasons, anti-reflection processing has never been carried out on the surface of a reflection polarizing film.

DISCLOSURE OF THE INVENTION

It is an object of the present invention to provide a monoaxially oriented multi-layer laminated film for use in a reflection polarizing plate, which solves the above problems of conventional multi-layer laminated films and greatly increases a brightness improving effect.

It is another object of the present invention to provide a brightness improving film for liquid crystal displays which is the above monoaxially oriented multi-layer laminated film of the present invention.

It is still another object of the present invention to provide a process for manufacturing a monoaxially oriented laminated film constituting the above monoaxially oriented multi-layer laminated film of the present invention.

Other objects and advantages of the present invention will become apparent from the following description.

According to the present invention, firstly, the above objects and advantages of the present invention are attained by a monoaxially oriented multi-layer laminated film comprising (A) a monoaxially oriented laminated film consisting of 501 or more alternating first layers made of a first thermoplastic resin having a positive stress optical coefficient and a thickness of 0.05 to 0.5 µm and second layers made of a second thermoplastic resin different from the first thermoplastic resin and having a thickness of 0.05 to 0.5 µm, and a low-reflectance layer formed on at least one side of the monoaxially oriented laminated film and having a reflectance of the surface measured from the input side of 3% or less; (B) the average reflectance of a polarization component parallel to the plane including the stretching direction of the monoaxially oriented laminated film and a direction perpendicular to the film plane being 90% or more at a wavelength of 400 to 800 nm, and the average reflectance of a polarization component perpendicular to the plane including the stretching direction of the film and the direction perpendicular to the film plane being 10% or less at a wavelength of 400 to 800 nm; and (C) the film being used in a reflection type polarizing plate.

According to the present invention, secondly, the above objects and advantages of the present invention are attained by a brightness improving film for liquid crystal displays which is the monoaxially oriented multi-layer laminated film of the present invention.

According to the present invention, thirdly, the above objects and advantages of the present invention are attained by a monoaxially oriented multi-layer laminated film comprising (A) a monoaxially oriented laminated film consisting of 501 or more alternating first layers made of a first thermoplastic resin having a positive stress optical coefficient and a thickness of 0.05 to 0.5 µm and second layers made of a second thermoplastic resin different from the first thermoplastic resin and having a thickness of 0.05 to 0.5 µm, and a low-refractive index layer formed on at least one side of the monoaxially oriented laminated film and having a refractive index of 1.1 to 1.45; (B) the average reflectance of a polarization component parallel to the plane including the stretching direction of the monoaxially oriented laminated film and a direction perpendicular to the film plane being 90% or more at a wavelength of 400 to 800 nm, and the average reflectance of a polarization component perpendicular to the plane including the stretching direction of the film and the direction perpendicular to the film plane being 10% or less at a wavelength of 400 to 800 nm; and (C) the film being used in a reflection type polarizing plate.

According to the present invention, in the fourth place, the above objects and advantages of the present invention are attained by a process for manufacturing a monoaxially oriented multi-layer laminated film, comprising the steps of:

a first step of forming a sheet by assembling together 501 or more layers of a first thermoplastic resin having a melting point of 260 to 270° C. and a second thermoplastic resin having a melting point 15 to 60° C. lower than the melting point of the first thermoplastic resin alternately;

a second step of stretching the obtained sheet in any one of a take-up direction and a cross direction to 2 to 10 times; and a third step of heating the stretched sheet at a temperature between a temperature 10° C. lower than the melting point of the second thermoplastic resin and a temperature 15° C. lower than the melting point of the first thermoplastic resin.

BRIEF DESCRIPTION OF THE DRAWING

FIG. 1 is a graph showing the reflectance for the wavelengths of the polarization components of light of the monoaxially oriented multi-layer laminated film of the present invention.

BEST MODE FOR CARRYING OUT THE INVENTION

The present invention will be described in detail herein under.

Monoaxially Oriented Laminated Film

In the present invention, the resin constituting the first layers must be a first thermoplastic resin having positive stress birefringence (same as "stress optical coefficient" in meaning). Examples of the first thermoplastic resin having positive stress birefringence include polyethylene-2,6-naphthalene dicarboxylate (to be referred to as "2,6-PEN") and isomers thereof (such as 1,4-, 1,5-, 2,7- and 2,3-PEN's), polyalkylene terephthalates (such as polyethylene terephthalate, polybutylene terephthalate and poly-1,4-cyclohexanedimethylene terephthalate), polyethylene isophthalate, polyimides (such as polyacrylic acid imide), polyether imide, polyalkylene polymers (such as polyethylene, polypropylene, polybutylene, polyisobutylene and poly(4-methyl)pentene), fluorinated polymers (such as perfluoroalkoxy resin, polytetrafluoroethylene, fluorinated ethylene-propylene copolymer, polyfluorinated vinylidene and polychlorotrifluoroethylene), chlorinated polymers (such as polyvinylidene chloride and polyvinyl chloride), polysulfone, polyether sulfone, polyacrylonitrile, polyamide, silicone resin, epoxy resin, polyvinyl acetate, polyether amide, ionomer resin, elastomers (such as polybutadiene, polyisoprene and neoprene), and polyurethanes.

Out of these, polyethylene-2,6-naphthalene dicarboxylate (2,6-PEN) and isomers thereof (such as 1,4-, 1,5-, 2,7- and 2,3-PEN's) and polyalkylene terephthalates (such as polyethylene terephthalate, polybutylene terephthalate and poly-1,4-cyclohexanedimethylene terephthalate) are preferred caused by having large stress birefringence. 2,6-, 1,4-, 1,5-, 2,7- and 2,3-PEN's are particularly preferred.

It should be understood that the above "polyethylene-2,6-naphthalene carboxylate" includes a homopolymer and a copolymer comprising ethylene-2,6-naphthalene dicarboxylate as the main recurring unit, for example, in an amount of 80 to 100 mol %, preferably 90 to 100 mol % of the total of all the recurring units. This shall apply to the other isomers. Similarly, it should be understood that the above "polyethylene terephthalate" includes a homopolymer and a copolymer comprising ethylene terephthalate as the main recurring unit, for example, in an amount of 80 to 100 mol %, preferably 90 to 100 mol % of the total of all the recurring units.

Examples of the second thermoplastic resin constituting the second layers include atactic polystyrenes, polycarbonates, polymethacrylates (such as polyisobutyl methacrylate, polypropyl methacrylate, polyethyl methacrylate and polymethyl methacrylate), polyacrylates (such as polybutyl acrylate and polymethyl acrylate), syndiotactic polystyrene (sPC), syndiotactic poly-α-methylstyrene, syndiotactic polydichlorostyrene, copolymers and blends of any one of these polystyrenes, and cellulose derivatives (such as ethyl cellulose, cellulose acetate, cellulose propionate, cellulose acetate butyrate and nitrocellulose) in addition to the above mentioned thermoplastic resins as the first thermoplastic resins.

The second thermoplastic resin must be different from the first thermoplastic resin but does not need to always have positive stress birefringence (same as "stress optical coefficient" in meaning). However, when a thermoplastic resin having positive stress birefringence is used as the second thermoplastic resin, it preferably has a melting point 15 to 60° C. lower than the melting point of the first thermoplastic resin. A copolymer having a melting point 15 to 60° C. lower than the melting point of 2,6-, 1,4-, 1,5-, 2,7- or 2,3-PEN which is particularly preferred as the first thermoplastic resin from the viewpoint of adhesion between layers is preferably used. Examples of the copolymer include PEN copolymers such as copolymers of 2,6-, 1,4-, 1,5-, 2,7- and/or 2,3-naphthalene dicarboxylic acids and esters thereof, and (a) terephthalic acid and esters thereof, (b) isophthalic acid and esters thereof, (c) phthalic acid and esters thereof, (d) alkanediols, (e) cycloalkanediols such as cyclohexanedimethanol, (f) alkanedicarboxylic acids and/or (g) cycloalkanedicarboxylic acids such as cyclohexanedicarboxylic acid; polyalkylene terephthalate copolymers such as copolymers of terephthalic acid and esters thereof, and (a) naphthalene dicarboxylate and esters thereof, (b) isophthalic acid and esters thereof, (c) phthalic acid and esters thereof, (d) alkanediols, (e) cycloalkanediols such as cyclohexanedimethanol, (f) alkanedicarboxylic acids and/or (g) cycloalkanedicarboxylic acids such as cyclohexanedicarboxylic acid; styrene copolymers such as styrene-butadiene copolymer and styrene-acrylonitrile copolymer; and a copolymer of 4,4'-dibenzoic acid and ethylene glycol.

A preferred example of the monoaxially oriented laminated film in the present invention will be described in detail herein under.

In the most preferred example of the present invention, the first thermoplastic resin constituting the first layers is a polyester comprising an ethylene-2,6-naphthalene dicarboxylate component as the main recurring unit. It is preferably homopolyethylene-2,6-naphthalene dicarboxylate or copolyethylene-2,6-naphthalene dicarboxylate comprising an ethylene-2,6-naphthalene dicarboxylate component in an amount of 95 mol- or more of the total of all the recurring units as they can maintain a higher melting point than that of the polyester constituting the second layers which will be described hereinafter. When the molar amount of the ethylene-2,6-naphthalene dicarboxylate component is smaller than 95 mol % of the total of all the recurring units, the melting point of the first thermoplastic-resin lowers and a difference in melting point between it and the polyester constituting the second layers is hardly obtained with the result that a sufficiently large difference in refractive index is hardly provided to the oriented laminated film. Out of these, homopolyethylene-2,6-naphthalene dicarboxylate is preferred as it can maintain a high melting point. Preferred examples of a comonomer other than the ethylene-2,6-naphthalene dicarboxylate component include acid components such as other aromatic carboxylic acids including isophthalic acid and 2,7-naphthalenedicarboxylic acid; aliphatic dicarboxylic acids including adipic acid, azelaic acid, sebacic acid and decanedicarboxylic acid; alicyclic dicarboxylic acids including cyclohexanedicarboxylic acid; and glycol components such as aliphatic diols including butanediol and hexanediol; and alicyclic diols including cyclohexane dimethanol.

The melting point of the resin constituting the first layers is preferably in the range of 260 to 270° C. because the difference in melting point between this resin and the resin constituting the second layers can be made relatively large. When the melting point of the resin constituting the first layers is lower than the lower limit, the difference in melting point between it and the resin constituting the second layers becomes small, thereby making it difficult to provide a sufficiently large difference in refractive index to the obtained oriented laminated film. The melting point of homopolyethylene-2,6-naphthalene dicarboxylate is generally around 267° C.

In the most preferred example of the present invention, the second thermoplastic resin constituting the second layers is a polyester comprising an ethylene-2,6-naphthalene dicarboxylate component as the main recurring unit and having a melting point of 210 to 255° C. A crystalline polyester is particularly preferred from the viewpoint of film formability by monoaxial orientation. It is a copolyethylene-2,6-naphthalene dicarboxylate comprising an ethylene-2,6-naphthalene dicarboxylate component in an amount of 40 to 98.5 mol %, preferably 75 to 97 mol % of the total of all the recurring units and a comonomer other than that, for example, ethylene terephthalate and/or ethylene isophthalate in an amount of 1.5 to 60 mol %, preferably 3 to 25 mol % as its melting point can be made lower than the melting point of the polyester constituting the first layers. When the molar amount of the ethylene-2,6-naphthalene dicarboxylate component is smaller than 75 mol % or the molar amount of the comonomer is larger than 25 mol % of the total of all the recurring units, the obtained polymer shows substantially noncrystallinity, film formability by monoaxial orientation lowers, the polymer greatly differs from the polyester constituting the first layers in composition, and adhesion between layers tends to degrade. When the molar amount of the ethylene-2,6-naphthalene dicarboxylate component is larger than 97 mol % or the amount of the comonomer is smaller than 3 mol % of the total of all the recurring units, the difference in melting point between the polyester and the polyester constituting the first layers becomes small, thereby making it difficult to provide a sufficiently high reflectance to the oriented laminated film. Examples of the comonomer other than the ethylene-2,6-naphthalene dicarboxylate component include acid components such as other aromatic carboxylic acids including isophthalic acid and 2,7-naphthalenedicarboxylic acid; aliphatic dicarboxylic acids including adipic acid, azelaic acid, sebacic acid and decanedicarboxylic acid; alicyclic dicarboxylic acids including cyclohexanedicarboxylic acid; and glycol components such as aliphatic diols including butanediol and hexanediol; and alicyclic diols including cyclohexane dimethanol. Out of these, terephthalic acid and isophthalic acid are preferred because their melting points can be easily reduced while stretchability can be retained relatively.

The melting point of the second thermoplastic resin constituting the second layers is preferably in the range of 210 to 255° C. as the difference between the melting point of the first thermoplastic resin constituting the first layers and the second thermoplastic resin can be made relatively large. When the melting point of the second thermoplastic resin constituting the second layers is higher than the upper limit, the difference in melting point between it and the first thermoplastic resin constituting the first layers becomes small, thereby making it difficult to provide a sufficiently large difference in refractive index to the obtained oriented laminated film. To make the melting point of the second thermoplastic resin constituting the second layers lower than the lower limit, the ratio of the second thermoplastic resin to the first thermoplastic resin constituting the first layers in composition must be greatly changed, which makes it difficult to provide sufficiently high adhesion between layers to the obtained monoaxially oriented laminated film. The melting point of the second thermoplastic resin constituting the second layers does not need to be low in a stage before the formation of a film and may be low after stretching. For example, homopolyethylene-2,6- naphthalene dicarboxylate and other polyester are prepared and melt kneaded together to carry out an ester exchange reaction.

The first layer and the second layer have a thickness of 0.05 to 0.5 μm, respectively, to selectively reflect light by optical interference between layers. The reflection characteristics of the multi-layer optical film are determined by the number of layers, the difference of refractive index and the thickness of each layer. Since the reflection wavelength band of the monoaxially oriented laminated film in the present invention is a visible to near infrared range, the first layers and the second layers must have the above thickness. When the thickness of each layer is larger than 0.5 μm, the reflection band becomes an infrared range, whereby the obtained film cannot be used as a reflection polarizing film. When the thickness is smaller than 0.05 μm, the reflection band becomes an ultraviolet range, whereby performance cannot be substantially obtained.

The monoaxially oriented laminated film in the present invention must consist of at least 501 layers. When the number of layers is smaller than 501, the above target optical properties cannot be obtained at a wavelength of 400 to 800 nm. The upper limit of the number of layers is preferably no more than 2,001 from the viewpoints of productivity and film handling ease.

In this monoaxially oriented laminated film, the ratio of the average thickness of the first layers to the average thickness of the second layers is preferably 0.5 to 5.0, more preferably 1.0 to 4.0, particularly preferably 1.5 to 3.5. By changing the thickness ratio of the first layers to the second layers, the mechanical properties of the monoaxially oriented laminated film can be adjusted without changing the resins in use while adhesion between layers is maintained. When the ratio of the average thickness of the first layers to the average thickness of the second layers is lower than 0.5, the monoaxially oriented laminated film is readily broken in the stretching direction and when the ratio is higher than 5.0, a change in the thickness of the monoaxially oriented laminated film tends to be large due to a difference in orientation alleviation by a heat treatment.

Although the wavelength to be reflected by the optical multi-layer film is determined by its refractive index, the number of layers and the thickness of each layer according to the above equation (1), it can reflect only a specific wavelength when the first layers and the second layers have fixed thicknesses.

The ratio of the maximum thickness to the minimum thickness of the first layers and the ratio of the maximum thickness to the minimum thickness of the second layers of the monoaxially oriented laminated film in the present invention is preferably 1.5 to 5.0, more preferably 2.0 to 4.0, particularly preferably 2.5 to 3.5. The first layers and the second layers may change in thickness stepwise or continuously. When the first layers and the second layers assembled together change in thickness, the obtained film can reflect light having a wider wavelength range. When the ratio of the maximum thickness to the minimum thickness of the first layers and the ratio of the maximum thickness to the minimum thickness of the second layers are lower than 1.5, it is difficult to obtain the above target reflection characteristics at a wavelength of 400 to 800 nm. When the ratio of the maximum thickness to the minimum thickness of the first layers and the ratio of the maximum thickness to the minimum thickness of the second layers are higher than 5.0, the reflection range becomes too wide and the reflectance lowers, thereby making it difficult to obtain the above target reflection characteristics. At least one layer having a thickness of 0.5 μm or more may be existent on the surface layer or in the inside of a multi-layer structure which changes stepwise or continuously.

The monoaxially oriented laminated film in the present invention has an average reflectance for a polarization component parallel to the plane including the stretching direction of the monoaxially oriented film and a direction perpendicular to the film plane of 90% or more, preferably 95% or more, much more preferably 98% or more at a wavelength of 400 to 800 nm and an average reflectance for a polarization component perpendicular to the above plane of 10% or less, preferably 5% or less, more preferably 3% or less, particularly preferably 1% or less at a wavelength of 400 to 800 nm. When the average reflectance for the polarization component parallel to the plane including the stretching direction of the monoaxially oriented film and the direction perpendicular to the film plane is less than 90% at a wavelength of 400 to 800 nm, the polarization reflectivity of the reflection polarizing film becomes unsatisfactory and does not exhibit satisfactory performance as a brightness improving film for liquid crystal displays. When the average reflectance for the polarization component perpendicular to the above plane is more than 10%, the polarization transmittance at a wavelength of 400 to 800 nm of the monoaxially oriented laminated film as a reflection polarizing film lowers, whereby its performance as a brightness improving film for liquid crystal displays deteriorates.

In the monoaxially oriented laminated film, it is preferred that the difference between the maximum reflectance and the minimum reflectance at a wavelength of 400 to 800 nm for a polarization component parallel to the plane including the stretching direction of the monoaxially oriented film and the direction perpendicular to the film plane should be 10% or less and that the difference between the maximum reflectance and the minimum reflectance at a wavelength of 400 to 800 nm for a polarization component perpendicular to the above plane should be 10% or less. When the difference between the maximum reflectance and the minimum reflectance for the above polarization component is larger than 10%, the color shift of reflected or transmitted light occurs, thereby causing a problem when it is used in a liquid crystal display.

FIG. 1 shows an example of the reflectance curve of the monoaxially oriented laminated film in the present invention. P polarization is a polarization component parallel to the plane including the stretching direction of the film and the direction perpendicular to the film plane and S polarization is a polarization component perpendicular to the plane including the stretching direction of the film and the direction perpendicular to the film plane.

The method of forming a multi-layer structure in the monoaxially oriented laminated film in the present invention is not particularly limited. Examples of the method include one using a multi-layer feed block device in which the polyester for the first layers is divided into 251 layers, the polyester for the second layers is divided into 250 layers, these first layers and second layers are assembled together alternately, and the passage of the resulting laminate is changed to 1 to 3 times continuously and one in which 201 uniform layers are assembled together by a multi-layer feed block device and the resulting laminated fluid is divided into three pieces perpendicularly to the stacked plane in a ratio of 1.0:1.3:2.0 and these pieces are assembled together again to obtain a total of 601 layers. A method in which these methods are combined may be also employed.

The monoaxially oriented laminated film in the present invention consists of at least 501 alternating first and second layers. The monoaxially oriented laminated film in the present invention is stretched in a monoaxial direction to satisfy optical properties required as the target reflection polarizing film as described above. The stretching direction may be a longitudinal direction or transverse direction. Multi-stage stretching may be carried out in limits that optical properties are satisfied. Known stretching such as heat stretching with a rod-like heater, roll heat stretching or tenter stretching may be employed. Tester stretching is preferred from the viewpoints of a reduction in the number of scratches produced by contact with a roller and stretching speed. It should be understood that the term "monoaxial orientation" does not mean that stretching is not carried out at all in a direction perpendicular to the monoaxial stretching direction but is used to comprehend that stretching is carried out to 1.2 times or less, preferably 1.1 times or less in the perpendicular direction.

It is particularly preferred that both of the first layers and the second layers of the monoaxially oriented laminated film in the present invention should be made of a crystalline resin which shows a positive stress optical coefficient and that the second thermoplastic resin for the second layers should be partially molten after stretching to alleviate its orientation in order to ensure adhesion between layers and the film formability of stretching. Preferably, the thus obtained monoaxially oriented laminated film has two or more melting points measured by DSC (differential scanning calorimeter) which differ from each other by 5° C. or more. It would be easily understood that the measured higher melting point is the melting point of the first thermoplastic resin for the first layers which shows a high refractive index and the lower melting point is the melting point of the second thermoplastic resin for the second layers which shows a low refractive index. More preferably, as the second layers after stretching are at least partially molten, its crystallization peak measured by DSC is existent at 150 to 220° C. If the crystallization peak is existent at a temperature lower than 150° C., either the first layers or the second layers quickly crystallize at the time of stretching the film, whereby film formability may lower and the homogeneity of the film may deteriorate, resulting in color nonuniformity. If the crystallization peak is existent at a temperature higher than 220° C., when the second layers are molten by heat setting in the manufacturing process which will be described hereinafter, crystallization occurs at the same time, thereby making it difficult to provide a sufficiently large difference in refractive index.

As for the monoaxially oriented laminated film in the present invention, a film having homogenous thickness is obtained by stretching the first thermoplastic resin for the first layers and the second thermoplastic resin for the second layers both of which exhibit crystallinity, and adhesion between layers and reflectivity can be improved by melting the second layers after stretching. Therefore, the monoaxially oriented laminated film in the present invention is preferably a monoaxially oriented laminated film whose crystallization peak measured by DSC is existent at 150 to 220° C. and two or more melting peaks different from each other by 5° C. or more are observed.

Preferably, the monoaxially oriented laminated film in the present invention has a break strength in the stretching direction of 100 MPa or more. When the break strength is lower than 100 MPa, the handling ease of the monoaxially oriented laminated film at the time of processing may lower and the durability of the monoaxially oriented laminated film as a product may degrade. When the break strength of the monoaxially oriented laminated film is 100 MPa or more, the stiffness of the film increases and the winding properties of the film improve. The break strength is preferably 150 MPa or more, more preferably 200 MPa in the longitudinal direction and preferably 150 MPa or more, particularly preferably 200 MPa or more in the transverse direction. The ratio of strength in the longitudinal direction to strength in the transverse direction is preferably 3 or less so that tear resistance can be fully provided. When the ratio of strength in the longitudinal direction to strength in the transverse direction is 2 or less, tear resistance can be further improved. The upper limit of break strength which is not particularly limited is preferably 500 MPa at the highest from the viewpoint of maintaining the stability of the stretching step.

The monoaxially oriented laminated film in the present invention has high heat dimensional stability when the first thermoplastic resin is polyethylene-2,6-naphthalene dicarboxylate. Even when a high temperature of 160° C. or more is required in the processing process, the film can be heated at that temperature without a problem. The thermal shrinkage factor of the film in a stretching direction (either one of the film forming direction and the cross direction) when it is heated at 150° C. for 30 minutes is preferably 5.0% or less, more preferably 1.5% or less, particularly preferably 1.0% or less. The thermal shrinkage factor of the monoaxially oriented laminated film in the present invention in either one of the film forming direction and the cross direction when it is heated at 200° C. for 10 minutes is preferably 3.0% or less, more preferably 2.0% or less, particularly preferably 1.5% or less.

In the monoaxially oriented laminated film in the present invention, preferably, the resins constituting the first layers and the second layers are preferably both crystalline as described above. When the resins constituting the first layers and the second layers are both crystalline, stretching hardly becomes nonuniform with the result that the thickness nonuniformity of the film can be made small. As for thickness nonuniformity, the thickness change rate represented by the following expression (3) is preferably less than 10%, more preferably less than 5%, particularly preferably less than 3%. When the change width of the thickness of the film is 10% or more, optical properties greatly shift and target optical properties cannot be obtained due to a color shift.

$$\text{Thickness change rate (\%)} = (T_{max} - T_{min})/(T_{Ave}) \quad (3)$$

wherein $T_{max}$ is the maximum thickness, $T_{min}$ is the minimum thickness, and $T_{Ave}$ is the average thickness.

The monoaxially oriented laminated film in the present invention contains inert particles in either the first layers or the second layers in an amount of preferably 0.001 to 0.5 wt %, more preferably 0.005 to 0.2 wt % based on the weight of the monoaxially oriented laminated film to improve the winding properties of the film. The average particle diameter of the inert particles is preferably 0.01 to 2 μm, more preferably 0.05 to 1 μm, particularly preferably 0.1 to 0.3 μm. When the average particle diameter of the inert particles is smaller than the lower limit or the amount of the inert particles is smaller than the lower limit, the effect of improving the winding properties of the monoaxially oriented laminated film may become unsatisfactory. When the amount of the inert particles is larger than the upper limit or the average particle diameter is larger than the upper limit, the deterioration of the optical properties of the multi-layer oriented film caused by the particles becomes marked disadvantageously.

Process for Manufacturing Monoaxially Oriented Laminated Film

The most preferred example of the process will be described in detail herein under.

The monoaxially oriented laminated film in the present invention is manufactured as follows. An unstretched multi-layer film is obtained by extruding at least 501 layers of a first thermoplastic resin having a melting point of 260 to 270° C., for example, a polyester (for first layers) comprising an ethylene-2,6-naphthalene dicarboxylate component as the main recurring unit and a second thermoplastic resin having a melting point after stretching at least 10° C. lower than that of the first thermoplastic resin, for example, a polyester (for second layers) comprising an ethylene-2,6-naphthalene dicarboxylate component as the main recurring unit while they are assembled together alternately in a molten state (the step of forming a sheet-like product). The layers of the laminate consisting of 501 or more layers change to 1.5 times to 5.0 times in thickness stepwise or continuously. The polyesters which are the first thermoplastic resin and the second thermoplastic resins are the same as those described for the first layers and the second layers. When the melting point of the polyester which is the first thermoplastic resin is lower than 260° C., a sufficiently large difference in melting point between it and the polyester which is the second thermoplastic resin is not obtained, thereby making it difficult to provide a sufficiently large difference in refractive index between the layers of the obtained monoaxially oriented laminated film. Since the melting point of homopolyethylene-2,6-naphthalene dicarboxylate is around 267° C., the upper limit of melting point of the first polyester for the first layers is about 270° C. at the highest. When the melting point of the second polyester for the second layers is not 15° C. or more lower than that of the first polyester, the difference of melting point between the first polyester and the second polyester is not large enough, thereby making it impossible to provide a sufficiently large difference in refractive index between the layers of the obtained monoaxially oriented laminated film. The upper limit of the difference between the melting point of the first polyester and the melting point of the second polyester is preferably 50° C. at the largest to maintain adhesion between them.

The thus obtained unstretched laminated film is stretched in a monoaxial direction (direction along the film plane) which is a film forming direction or a cross direction perpendicular to the above direction. The stretching temperature is preferably the glass transition point temperature (Tg) of the first thermoplastic resin, for example, a polyester to (Tg+50° C.). The area draw ratio is preferably 2 to 10 times. As the draw ratio increases, variations in the plane direction of the first layers and the second layers become smaller by stretching. That is, the optical interference of the monoaxially oriented laminated film becomes uniform in the plane direction advantageously. Known stretching such as heat stretching with a rod-like heater, roll heat stretching or tenter stretching may be employed. Tenter stretching is preferred from the viewpoints of a reduction in the number of scratches produced by contact with the roller and stretching speed.

The big feature of the most preferred process is that the thus stretched laminated film is heated at a temperature between a temperature 10° C. lower than the melting point of the second thermoplastic resin, for example, a polyester and a temperature 15° C. lower than the melting point of the first thermoplastic resin, for example, a polyester to alleviate the orientation of a molecular chain in the second layers so as to reduce the refractive index of the second layers. When the heat treatment temperature is more than 10° C. lower than the melting point of the second thermoplastic resin, the effect of reducing the refractive index by alleviating the orientation of the molecular chain in the second layers becomes unsatisfactory, thereby making it impossible to provide a sufficiently large refractive index difference to the obtained monoaxially oriented laminated film. When the heat treatment temperature is not 10° C. or more lower than the melting point of the first thermoplastic resin, the orientation of the molecular chain in the first layers is also alleviated to reduce the refractive index of the first layers, thereby making it impossible to provide a sufficiently large refractive index difference to the obtained monoaxially oriented laminated film. The preferred heat treatment temperature is a temperature between a temperature 6° C. lower than the melting point of the second thermoplastic resin and a temperature 16° C. lower than the melting point of the first thermoplastic resin, more preferably a temperature between a temperature 2° C. lower than the melting point of the second thermoplastic resin and a temperature 18° C. lower than the melting point of the first thermoplastic resin. The heat treatment time is preferably 1 to 60 seconds.

By changing the heat treatment temperature and time, the refractive index of the second layers can be adjusted without changing the compositions of the resins. That is, the reflection characteristics of the monoaxially oriented laminated film can be changed without altering the compositions of the resins.

Low-Reflectance Layer

The monoaxially oriented multi-layer laminated film of the present invention has a low-reflectance layer having a surface reflectance for light incident upon at least one side of the above monoaxially oriented laminated film of 3% or less. When the surface reflectance of the low-reflectance layer (may be referred to as "anti-reflection layer" hereinafter) is higher than 3%, the surface anti-reflection effect on the transmission axis side of the monoaxially oriented multi-layer laminated film becomes unsatisfactory and a sufficient brightness increasing effect is not obtained. The surface reflectance is preferably 2% or less, more preferably 1% or less.

The anti-reflection layer used in the present invention is not particularly limited if it does not impair the above optical properties of the monoaxially oriented laminated film. Examples of the anti-reflection layer include (1) an anti-reflection layer composed of a very thin film having a thickness of about 0.1 μm and made of $MgF_2$, (2) an anti-reflection layer which is a deposited metal film, (3) an anti-reflection layer having a low-refractive index layer made of a material having a low refractive index formed on a monoaxially oriented laminated film, (4) an anti-reflection layer having a high-refractive index layer on a monoaxially oriented laminated film and a low-refractive index layer having a lower refractive index than the refractive index of the high-refractive index layer on the high-refractive index layer (for example, an ultra fine particle layer of a metal oxide having a high refractive index is dispersed on a portion in contact with the monoaxially oriented laminated film of the anti-reflection layer), (5) an anti-reflection layer consisting of sets of the above layers (4), and (6) an anti-reflection layer having an intermediate-refractive index layer having a lower refractive index than the refractive index of a high-refractive index layer on the inner side of the high-refractive index layer (screen side when mounted on the screen) and a low-refractive index layer having a lower refractive index than the refractive index of the intermediate-refractive index layer on the outer side (side opposite to the screen side when mounted on the screen) of the high-refractive index layer.

Out of these, the above low-refractive index layer (4) and the anti-reflection layer (6) are preferred, and a laminate consisting of an intermediate-refractive index layer, a high-refractive index layer and a low-refractive index layer formed on a monoaxially oriented laminated film in the mentioned order is more preferred because they can prevent reflection more effectively. Particularly preferred is an anti-reflection layer comprising a low-refractive index layer, an intermediate-refractive index layer and a high-refractive index layer all of which are made of SiOx, the low-refractive index layer having a refractive index of more than 1.4, the high-refractive index layer having a refractive index of less than 2.2, the low-refractive index layer having a thickness of 80 to 110 nm, the high-refractive index layer having a thickness of 30 to 110 nm, the intermediate-refractive index layer having a thickness of 50 to 100 nm, and the optical film thickness D (D=n·d, n is the refractive index of the intermediate-refractive index layer and d is the thickness of the intermediate-refractive index layer) of each layer being smaller than the wavelength of visible light.

The above low-refractive index layer has a refractive index of preferably 1.1 to 1.45, more preferably 1.1 to 1.4. When the refractive index of the layer is lower than 1.1, an anti-reflection effect is hardly obtained and when the refractive index is higher than 1.45, an anti-reflection effect becomes weak.

The low-refractive index layer is obtained by first applying a coating solution having the following specific composition to at least one side of the monoaxially oriented laminated film.

This coating solution comprises (a) coated fine particles consisting of inorganic fine particles substantially made of an oxide of at least one element selected from the group consisting of Si, Al, Ti and Zr and an organic polymer for covering the surfaces of the particles, (b) a binder resin and (c) an organic solvent having a boiling point of 100° C. or higher.

Preferably, the above inorganic fine particles are substantially made of silicon oxide.

Preferably, these inorganic fine particles are formed by the condensation of a partial hydrolyzate or hydrolyzate of an alkoxide. In this case, the alkoxide means a substance having an alkoxy group (-OR group) bonded to the above element. R is a lower alkyl group, preferably methyl group, ethyl group, normal propyl group, isopropyl group, normal butyl group or isobutyl group. Preferably, the inorganic fine particles partially contains a hydroxyl group or an alkoxy group. The alkoxy group can improve affinity between the inorganic fine particles and the organic polymer or binder resin which is used to modify the inorganic fine particles which will be described hereinafter or can form a chemical bond between them. It also serves to improve the dispersibility of the inorganic fine particles in the organic solvent. An alkoxide has alkoxy groups corresponding to the valence of its center element. In the present invention, an alkoxide having 3 to 4 alkoxy groups is preferred.

The particle diameters of the above inorganic fine particles are preferably in the range of 5 to 200 nm.

Examples of the organic polymer for covering the surfaces of the inorganic fine particles include alkyl-based polymers, polymers having an urethane bond, polymers having an ester bond, polymers having an ether bond, and acrylic polymers. Out of these, acrylic polymers are preferred because they can easily adjust the refractive index and have excellent transparency. It is preferred from the viewpoint of dispersibility that the organic polymer should have at least one polysiloxane group and that at least one alkoxy group should be contained in the polysiloxane group. Examples of the alkoxy group are the same as described above. Preferably, the organic polymer contains fluorine.

In the present invention, the particle diameters of the above coated fine particles are preferably in the range of 5 to 200 nm. When the particle diameters of the fine particles are smaller than 5 nm, the surface energy of the particles becomes high, whereby the particles readily agglomerate in the coating solution and when the particle diameters are larger than 200 nm, the obtained coating film does not have sufficiently high transparency.

Examples of the binder resin (b) which is not particularly limited include alkyl-based polymers, polymers having an urethane bond, polymers having an ester bond, polymers having an ether bond and acrylic polymers. Out of these, acrylic polymers are preferred because they have excellent transparency. The acrylic polymers which are not particularly limited are polymers polymerized from a monomer having an acryl group such as a monofunctional acrylate exemplified by methyl (meth)acrylate, ethyl (meth)acrylate, propyl (meth) acrylate, isopropyl (meth)acrylate, isobutyl (meth)acrylate, t-butyl (meth)acrylate and 3-hydroxyethyl (meth)acrylate, or a bifunctional acrylate exemplified by ethylene glycol di(meth)acrylate, propylene glycol di(meth)acrylate and butylenes glycol di(meth)acrylate. Further, alkyl polymers having an acryl group at one terminal, ether polymers, and polymers having a reactive functional group such as hydroxyl group, carboxyl group, amino group, epoxy group, mercapto group or oxazoline group in the side chain of these polymers may also be used advantageously. In the present invention, the above polymers having an acryl group are referred to as "acrylic polymers". Out of these polymers, acrylic polymers containing a hydroxyl group in part of its structure are preferred in consideration of a reaction with a curing agent which will be described hereinafter.

Examples of the organic solvent (c) which is miscible with water and has a boiling point of 100° C. or higher include propylene glycol monomethyl ether (PGM, boiling point of 121° C.), propylene glycol monomethyl ether acetate (PGMA, boiling point of 146° C.), ethylene glycol monobutyl ether (EGB, boiling point of 171° C.), methyl isobutyl ketone (MIBK, boiling point of 115° C.), isobutyl acetate (IBAc, boiling point of 127° C.) and methyl-n-butyl ketone (MNBK, boiling point of 128° C.). Out of these, methyl isobutyl ketone, isobutyl acetate and methyl-n-butyl ketone are preferred, and methyl isobutyl ketone is particularly preferred. The refractive index of the obtained low-refractive index layer rarely changes even when the solid content is changed with a solvent which has a boiling point lower than 100° C. and is immiscible with water like toluene or methyl ethyl ketone. When an organic solvent having a boiling point of 100° C. or higher, preferably 100 to 150° C., more preferably 100 to 130° C. is used, even if the composition of solid matter constituting the low-refractive index layer is the same, the refractive index of the obtained low-refractive index layer can be adjusted by changing the composition of the coating solution such as solid content. When the boiling point of the solvent is lower than the lower limit, the low refractive index in the present invention cannot be obtained and when the boiling point is higher than the upper limit, the production line speed must be slowed down, or an oven must be set at a very high temperature disadvantageously. The above organic solvent must be miscible with water. The expression "miscible with water" means that the organic solvent has a polar group such as a hydroxyl group or carbonyl group. For example, the organic solvent can be mixed with 1 wt % or more, preferably 5 wt % or more of water uniformly. The advantage that the refractive index can be adjusted without changing the composition of solid matter constituting the low-refractive index layer is easily understood from the fact that various refractive indices can be obtained with single composition. That is, it cannot be said that the refractive index of the low-refractive index layer must be simply low, and there is an optimum refractive index which satisfies an amplitude condition according to the refractive index of the formed substrate film. Therefore, an advantage that a layer having an optimum refractive index is obtained with single composition without preparing materials for forming a plurality of low-refractive index layers for a plurality of substrate films is extremely large. When the boiling point of the organic solvent is lower than 100° C., no change in refractive index is seen maybe because uniform voids are not obtained due to the quick volatilization of the solvent at the time of drying after coating. When the solvent volatilizes after water in air is contained in a coating solution by a reduction in the temperature of the coating solution caused by vaporization heat at the time of drying after coating, gradients of solvent and water volatilization rates are formed, thereby making drying non-uniform and forming large voids in the coating film with the result of the reduced transparency of the coating film. Therefore, a high-boiling point solvent which is miscible with water and has a small difference in volatilization rate before and after mixing must be used.

As described above, it cannot be said that the refractive index of the low-refractive index layer must be simply low, and there is an optimum refractive index which satisfies the amplitude condition according to the refractive index of the film substrate in use. For example, when the film substrate is a polyethylene naphthalate film, high anti-reflection performance can be obtained with a low-refractive index layer having a refractive index proposed by JP-A2003-292805, that is, 1.3 or more. However, in the case of a film substrate such as a polyethylene terephthalate or triacetyl cellulose film, high anti-reflection performance cannot be obtained with a low-refractive index layer having a refractive index of 1.3 or more. However, with the method of the present invention, the inventors of the present invention have succeeded in forming a low-refractive index layer having a refractive index of 1.10 to 1.29 on the surface of a film substrate.

To obtain such a low refractive index, for example, the solid content of the coating solution is reduced, the amount of an organic solvent miscible with water and having a boiling point of 100° C. or higher is increased, or an organic solvent which readily remains in the coating film at the time of drying after coating is selected. From this point of view, it is desired that an organic solvent miscible with water and having a boiling point of 100° C. or higher should be contained in the coating solution in an amount of preferably 70 wt %. or more, more preferably 80 wt % or more, much more preferably 90 wt % or more, particularly preferably 95 wt % or more. When the amount of the organic solvent is smaller than the above lower limit, voids are hardly formed in the low-refractive index layer, or the low-refractive index layer may become clouded at the time of drying by a convection current formed by the volatilization of another solvent existent in the coating solution. The solid content for forming the low-refractive index layer at the time of coating is preferably 0.5 to 10 wt %, more preferably 0.5 to 5 wt % because the refractive index can be easily adjusted. To further reduce the refractive index, the solid content is much more preferably 0.5 to 2 wt %, particularly preferably 0.5 to 1.8 wt %. Outside the above range, it is difficult to make the obtained low-refractive index layer thick enough to have satisfactory reflection characteristics.

The thickness of the film substrate is not particularly limited but preferably 200 μm or less. When the thickness of the film substrate is larger than 200 μm, it is difficult to handle the obtained anti-reflection film when it is mounted to a display because its stiffness is too high.

Preferably, the above coating solution used in the present invention further contains an alkoxy compound represented by the following formula:

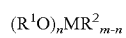

wherein $R^1$ and $R^2$ are each independently an alkyl group having 1 to 4 carbon atoms, M is Al, Si, Ti or Zr, m is a number equivalent to the valence of M, and n is an integer of 2 to m.

The above alkoxy compound has the function of fixing coated fine particles in the low-refractive index layer.

Out of the compounds represented by the above formula, hydrolyzable compounds are preferred, as exemplified by methyltriacetoxysilane, dimethyldiacetoxysilane, trimethylacetoxysilane, tetraacetoxysilane, tetramethoxysilane, tetraethoxysilane, tetraisopropoxysilane, tetraisobutoxysilane, methyltriethoxysilane, dimethyldiethoxysilane, trimethylethoxysilane and phenyltriethoxysilane. A catalyst may be contained in the coating solution to promote the hydrolytic condensation of the binder resin for forming the above low-refractive index layer and the organic polymer for covering the surface of the fine particles efficiently. The catalyst may be an acid catalyst or basic catalyst. Preferred examples of the acid catalyst include inorganic acids such as hydrochloric acid and nitric acid, and organic acids such as acetic acid, citric acid, propionic acid, oxalic acid and p-toluenesulfonic acid. Preferred examples of the basic catalyst include organic amine compounds such as ammonia, triethylamine and tripropylamine, and alkali metal compounds such as sodium methoxide, potassium methoxide, potassium ethoxide, sodium hydroxide and potassium hydroxide.

The aging time of the coating solution required for promoting satisfactory hydrolysis which depends on the pH and ambient temperature and humidity of the coating solution is preferably 1 hour or longer.

The coating solution in the present invention may contain a crosslinking agent for the binder resin (b). This crosslinking agent crosslinks and cures the binder resin (b) when the coating film is dried.

Examples of the crosslinking agent include polyfunctional isocyanate compounds, melamine compounds and aminoplast resin. Out of them, polyfunctional isocyanate compounds are preferred because they are easy to handle. The polyfunctional isocyanate compounds include biurets of tolylene diisocyanate, xylylene diisocyanate, diphenylmethane diisocyanate, hexamethylene diisocyanate and 1,6-hexamethylene diisocyanate and trimers such as isocyanurate. Compounds having two or more residual isocyanate groups formed by a reaction between a polyfunctional isocyanate and a polyhydric alcohol and blocked polyfunctional isocyanate compounds sealed by a block agent such as an oxime or lactam may also be used.

In the present invention, the low-refractive index layer can be formed on the monoaxially oriented laminated film by coating. Any known coating technique can be employed. Examples of the coating technique include lip direct coating, comma coating, slit reverse coating, die coating, gravure roll coating, blade coating, spray coating, air knife coating, dip coating and bar coating. When a thermosetting resin is used as the binder, a coating film of a low-refractive index compound is formed by applying a coating solution containing components for forming the coating film to a substrate and drying it by heating. The heating conditions include a temperature of 80 to 160° C. and a time of 10 to 120 seconds, particularly preferably a temperature of 100 to 150° C. and a time of 20 to 60 seconds. When an UV curable resin or EB curable resin is used as the binder, after pre-drying, the coating film is generally exposed to ultraviolet radiation or electron beam.

EXAMPLES

The following Examples are provided to further illustrate the present invention. Physical properties and characteristic properties in the Examples were measured or evaluated by the following methods.

(1) Melting Point and Glass Transition Point (Tg) of Polyester Resin 10 mg of a polyester resin specimen is sampled to measure its melting point with DSC (DSC2920 of TA Instruments Co., Ltd.) at a temperature elevation rate of 20° C./min.

(2) Thickness of Each Layer

The sample is cut into a triangle, fixed in a capsule, and then embedded in an epoxy resin. The embedded sample is sliced in a film forming direction and a thickness direction with a microtome (ULTRACUT-S of Rheihelt Co., Ltd.) to obtain a 50 nm-thick film piece. The obtained film piece is observed and photomicrographed by a transmission electron microscope (JEM2010(trade name) of JEOL Ltd.) at an acceleration voltage of 100 kV, and the thickness of each layer is measured from the photomicrograph. The definition of film thickness shown in Table 1 is given below. Layer thickness ratio: average thickness of layers having a thickness of 0.05 to 0.5 out of the first layers (3) Measurement of Melting Point and Crystallization Peak Measured by DSC of Film 10 mg of the sample film is sampled to measure its crystallization temperature and melting point by DSC (DSC2920 of TA Instruments Co., Ltd.) at a temperature elevation rate of 20° C./min.

(4) Reflectance and Reflection Wavelength

A spectrophotometer (MPC-3100 of Shimadzu Corporation) is used, and a polarization filter is mounted on a light source side to measure reflectance on a relative mirror deposited by aluminum at a wavelength of 400 to 800 nm. A measurement value obtained when the transmission axis of the polarization filter is aligned with the stretching direction of the film is taken as P polarization and a measurement value obtained when the transmission axis of the polarization filter is made perpendicular to the stretching direction is taken as S polarization. The average value of reflectances of these polarization components at a wavelength of 400 to 800 nm is taken as average reflectance, the largest value out of the measured reflectances is taken as the maximum reflectance, and the smallest value is taken as the minimum reflectance. The maximum reflectance difference in Table 3 is expressed by the following equation.

Maximum reflectance difference (%)=maximum reflectance (%)−minimum reflectance (%)

(5) Thickness and Refractive Index of Low-Refractive Index layer

The thickness and refractive index of the low-refractive index layer are obtained by measuring reflectance at a wavelength of 300 to 800 nm with a reflection spectral film thickness meter (FE-3000 (trade name) of Otsuka Denshi Co., Ltd.), citing an n-k Cauchy dispersion expression as a typical refractive index wavelength dispersion approximate expression and fitting the actual measurement value of the spectrum into the expression.

(6) Break Strength

As for break strength in the film forming direction, the sample film is cut into a piece having a width (cross direction) of 10 mm and a length (film forming direction) of 150 mm, and this sample is pulled at a chuck interval of 100 mm, a pulling rate of 100 mm/min and a chart rate of 500 m/min with an Instron type universal tensile tester. The break strength is measured from the obtained load-elongation curve.

The break strength in the cross direction is measured in the same manner as the break strength in the film forming direction except that the sample film is cut into a piece having a width (film forming direction) of 10 mm and a length (cross direction) of 150 mm.

(7) Thermal Shrinkage Factor

As for the thermal shrinkage factor of the sample film when it is heated at 150° C. for 30 minutes, a dimensional change before and after a heat treatment in which the sample film is kept in an oven set at 150° C. for 30 minutes under no tension is calculated from the following expression as a thermal shrinkage factor.

Thermal shrinkage factor %=((L0−L)/L0)×100

L0: gauge length before heat treatment
L: gauge length after heat treatment

As for the thermal shrinkage factor of the sample film when it is heated at 200° C. for 10 minutes, a dimensional change before and after a heat treatment in which the sample film is kept in an oven set at 200° C. for 10 minutes under no tension is calculated from the above expression as a thermal shrinkage factor.

(8) Thickness Change Rate

A film sample measuring 1 m×1 m cut out from a film in the film forming direction and the cross direction is cut into 25 pieces which are 2 cm wide in the longitudinal direction and the transverse direction to measure the thickness of each sample with an electronic micrometer and a recorder (K-312A, K310B of Anritsu Corporation) continuously. The average thickness is calculated from all the measurement values, measurement values are obtained for each interval of 200 mm, and the maximum value and the minimum value are read from the measurement values to calculate a thickness change rate from the average thickness based on the following equation.

Thickness change rate (%)=$(T_{max}-T_{min})/T_{Ave}$ wherein $T_{max}$ is the maximum value of thickness, $T_{min}$ is the minimum value of thickness, and $T_{Ave}$ is the average thickness.

(9) Adhesion Between Layers

After a 100 mm-long 24 mm-wide adhesive tape (Cellotape of Nichiban Co., Ltd.) is affixed to both sides of the sample film (10 mm×50 mm) and peeled off at an angle of 180°, the surface from which the tape has been peeled off is observed. This is carried out on 10 samples to calculate the number of times of separation between layers.

(10) Color Shift

L*, a* and b* of the L*a*b* color specification system are obtained from the transmission spectrum of the sample film for the standard light source C in accordance with JISZ8729. The deviation of chroma from achromatic color is evaluated with ab chroma (C*ab) obtained from the following equation.

C*ab={$(a^*)^2+(b^*)^2$}$^{1/2}$

◯: excellent with a C*ab of less than 5
Δ: usable with a C*ab of 5 or more and less than 10
X: not usable with a C*ab of 10 or more

(11) Brightness Improving Effect

The sample film is inserted between a polarizing plate and a diffusion film in an LCD panel (CMV CT-529A of Chimei Co., Ltd.) to measure brightness on axis at a distance of 500 mm with a brightness meter (BM7 of Topcon Co., Ltd.) when white color is displayed by PC so as to calculate an increase in brightness after the insertion of the sample film from brightness before the insertion of the sample film. Thus, the brightness improving effect is evaluated.

⊚: a brightness increase of 150% or more
◯: a brightness increase of 140% or more and less than 150%
X: a brightness increase of less than 140%

(12) Surface Reflectance

The UV-3101PC of Shimadzu Corporation is used, an absorption type polarizing filter is mounted on a light source side, a black paint is applied to the side devoid of the anti-reflection layer of the anti-reflection film, and the anti-reflection layer formed side is illuminated to measure its reflectances for P polarization and S polarization at a wavelength of 300 to 800 nm. The average value of reflectances at a wavelength of 500 to 600 nm which are highly visible is taken as surface reflectance.

Example 1

A mixture of polyethylene-2,6-naphthalene dicarboxylate (PEN) having an intrinsic viscosity (orthochlorophenol, 35° C.) of 0.62 and 0.15 wt % of spherical silica particles (average particle diameter: 0.3 µM, ratio of long diameter to short diameter: 1.02, average deviation of particle diameter of 0.1) was prepared as a polyester for first layers, and copolyethylene-2,6-naphthalene dicarboxylate containing 10 mol % of terephthalic acid (TA10PEN) and having an intrinsic viscosity (orthochlorophenol, 35° C.) of 0.62 was prepared as a polyester for second layers. The polyester for first layers and the polyester for second layers were dried at 170° C. for 5 hours and supplied into an extruder to be heated up to 300° C. to be molten, the polyester for first layers was divided into 301 layers, the polyester for second layers was divided into 300 layers, the first layers and the second layers were assembled together alternately by using a multi-layer feed block device which continuously changed the ratio of the largest thickness to the smallest thickness up to 3 times, and the resulting laminate was introduced into a die while the assembly state was maintained and cast over a casting drum to adjust the thickness ratio of the first layers to the second layers to 1.0:2.0 so as to produce an unstretched laminated film consisting of a total of 601 alternating first layers and second layers. This unstretched laminated film was stretched to 5.2 times at 135° C. in the transverse direction and heat set at 245° C. for 3 seconds. The obtained monoaxially oriented laminated film had a thickness of 55 µm.

5 g of a commercially available coating material for forming a low-refractive index layer containing hollow silica particles modified by a fluorinated organic compound and comprising a silane coupling agent and an acrylic resin as the main components (PX2-LR7 of Nippon Shokubai Co., Ltd.), 66.2 g of MIBK and 0.12 g of an isocyanate-based curing agent were mixed and stirred together for 10 minutes to prepare a coating solution. This coating solution was applied to one side of the monoaxially stretched laminated film obtained herein with a Meyer bar and dried and cured at 150° C. for 1 minute to obtain a low-refractive index layer. The thickness of the coating film was adjusted to 110 nm with the yarn number of the Meyer bar. The physical properties of the obtained monoaxially oriented multi-layer laminated film are shown in Table 3 and Table 4. The refractive index of the low-refractive index layer of the monoaxially oriented multi-layer laminated film was 1.24.

Example 2

A monoaxially oriented multi-layer laminated film was obtained in the same manner as in Example 1 except that its both sides were coated. The physical properties of the obtained monoaxially oriented multi-layer laminated film are shown in Table 3 and Table 4. The reflectance of the low-refractive index layer of the monoaxially oriented multi-layer laminated film was 1.24.

Comparative Example 1

A monoaxially oriented laminated film was obtained in the same manner as in Example 1 except that a coating layer was not formed. The physical properties of the obtained monoaxially oriented laminated film are shown in Table 3 and Table 4.

Example 3

A product obtained by adding dispersing 0.5 wt % of $SiO_2$ particles (AEROSIL R972 of Nippon Aerosil Co., Ltd., average particle diameter of 20 nm) based on an alkoxide and 15% of γ-glycidoxypropyltrimethoxysilane based on the alkoxide in a ligroin/n-butanol (3/1) solution of tetrabutyl titanate as a tetramer (TBT B-4 of Nippon Soda Co., Ltd.) was applied to one side of the monoaxially oriented laminated film used in Comparative Example 1 by microgravure coating and dried at 150° C. for 2 minutes to form an about 80 nm-thick coating film (refractive index of 1.75). An $SnO_2$ layer having a thickness of 65 nm (refractive index of 2.05) was formed on this coating film by sputtering. Finally, a $SiO_2$ sol obtained by dissolving tetraethyl silicate in ethanol and adding water and hydrochloric acid to the resulting solution for hydrolysis was applied to the $SnO_2$ layer and heated at 100° C. for 2 minutes to form a gel film (refractive index of 1.45) so as to obtain a monoaxially oriented multi-layer laminated film. The physical properties of the obtained film are shown in Table 3.

TABLE 1

| | Resin for first layers | | | Resin for second layers | | | |
| | Resin | | | Resin | | | |
| | Resin | Melting point (° C.) | Number of layers | Resin | Melting point (° C.) | Number of layers | Total number of layers |
| --- | --- | --- | --- | --- | --- | --- | --- |
| Ex. 1 | PEN | 269 | 301 | TA10PEN | 247 | 300 | 601 |
| Ex. 2 | PEN | 269 | 301 | TA10PEN | 247 | 300 | 601 |
| C. Ex. 1 | PEN | 269 | 301 | TA10PEN | 247 | 300 | 601 |

TABLE 1-continued

| | Thickness | | | | | | | |
|---|---|---|---|---|---|---|---|---|
| | | | First layers | | | Second layers | | Maximum thickness/ Minimum thickness ratio [nm] |
| | Total thickness [um] | Thickness ratio | Minimum thickness [nm] | Maximum thickness [nm] | Maximum thickness/ Minimum thickness ratio | Minimum thickness [nm] | Maximum thickness [nm] | |
| Ex. 1 | 55 | 2.0 | 15 | 46 | 3.00 | 31 | 92 | 3.0 |
| Ex. 2 | 56 | 2.0 | 16 | 47 | 3.00 | 31 | 93 | 3.0 |
| C. Ex. 1 | 56 | 2.0 | 16 | 47 | 3.00 | 31 | 93 | 3.0 |

Ex.: Example
C. Ex.: Comparative Example

TABLE 2

| | Stretching in film forming direction | | stretching in cross direction | | Heat setting |
|---|---|---|---|---|---|
| | Draw ratio (times) | Temperature (° C.) | Draw ratio (times) | Temperature (° C.) | Temperature (° C.) |
| Ex. 1 | 1.0 | — | 5.2 | 135 | 245 |
| Ex. 2 | 1.0 | — | 5.2 | 135 | 245 |
| C. Ex. 1 | 1.0 | — | 5.1 | 135 | 150 |

TABLE 3

| | Optical properties | | | | | | | |
|---|---|---|---|---|---|---|---|---|
| | P polarization component | | | S polarization component | | | | |
| | Average reflectance [%] | Maximum reflectance difference [%] | Surface reflectance | Average reflectance [%] | Maximum reflectance difference [%] | Surface reflectance | Color shift | Increase in brightness |
| Ex. 1 | 97 | 6 | 97 | 6 | 7 | 0.5 | ○ | ○ |
| Ex. 2 | 98 | 6 | 98 | 1 | 7 | 0.5 | ○ | ◉ |
| Ex. 3 | 97 | 6 | 97 | 6 | 8 | 0.6 | ○ | ○ |
| C. Ex. 1 | 98 | 6 | 98 | 11 | 9 | 5.5 | ○ | X |

Ex.: Example
C. Ex.: Comparative Example

TABLE 4

| | DSC measurement results | | | Break strength | | Thermal shrinkage factor | Thickness | |
|---|---|---|---|---|---|---|---|---|
| | Crystallization peak [° C.] | Melting point on low temperature side [° C.] | Melting point on high temperature side [° C.] | Film forming direction [MPa] | Cross direction [MPa] | [MD/TD] 150° C. × 30 min [%] | change rate [MD/TD] [%] | Adhesion between layers |
| Ex. 1 | 171 | 251 | 264 | 92 | 304 | 0.0/0.8 | 3.6/4.8 | 0/10 |
| Ex. 2 | 171 | 251 | 264 | 92 | 304 | 0.0/0.8 | 3.6/4.8 | 0/10 |
| C. Ex. 1 | 171 | 251 | 264 | 92 | 304 | 0.0/0.8 | 3.6/4.8 | 0/10 |

Ex.: Example
C. Ex.: Comparative Example

The invention claimed is:

1. A monoaxially oriented multi-layer laminated film comprising (A) a monoaxially oriented laminated film consisting of 501 or more alternating first layers made of a first thermoplastic resin having a positive stress optical coefficient and a thickness of 0.05 to 0.5 μm and second layers made of a second thermoplastic resin different from the first thermoplastic resin and having a crystallization peak measured by DSC of 150 to 220° C. and a thickness of 0.05 to 0.5 μm, and a low-reflectance layer formed on at least one side of the monoaxially oriented laminated film and having a reflectance of the surface measured from the input side of 3% or less, wherein the first thermoplastic resin is a polyester comprising ethylene-2,6-naphthalene dicarboxylate in an amount of 95 mol % or more of the total of all the recurring units and has a melting point of 260 to 270° C. and the second thermoplastic resin is a copolyester containing 75 to 97 mol % of ethylene-2,6-naphthalene dicarboxylate and 25 to 3 mol % of ethylene terephthalate and/or ethylene isophthalate based on the total of all the recurring units and has a melting point of 210 to 255° C. and 15 to 60° C. lower than the melting point of the first thermoplastic resin; (B) the average reflectance of a polarization component parallel to the plane including the stretching direction of the monoaxially oriented laminated film and a direction perpendicular to the film plane being 90% or more at a wavelength of 400 to 800 nm, and the average reflectance of a polarization component perpendicular to the plane including the stretching direction of the film and the direction perpendicular to the film plane being 10% or less at a wavelength of 400 to 800 nm; and (C) the film having a thickness change rate of less than 5% and being used in a reflective polarizing plate.

2. The monoaxially oriented multi-layer laminated film according to claim 1, wherein the difference between the maximum reflectance and the minimum reflectance at a wavelength of 400 to 800 nm of a polarization component parallel to the plane including the stretching direction of the film and the direction perpendicular to the film plane is 10% or less.

3. The monoaxially oriented multi-layer laminated film according to claim 1, wherein the difference between the maximum reflectance and the minimum reflectance at a wavelength of 400 to 800 nm of a polarization component perpendicular to the plane including the stretching direction of the film and the direction perpendicular to the film plane is 10% or less.

4. A brightness improving film for liquid crystal displays which is the monoaxially oriented multi-layer laminated film of claim 1.

5. A monoaxially oriented multi-layer laminated film comprising (A) a monoaxially oriented laminated film consisting of 501 or more alternating first layers made of a first thermoplastic resin having a positive stress optical coefficient and a thickness of 0.05 to 0.5 μm and second layers made of a second thermoplastic resin different from the first thermoplastic resin and having a crystallization peak measured by DSC of 150 to 220° C. and a thickness of 0.05 to 0.5 μm, and a low-refractive index layer formed on at least one side of the monoaxially oriented laminated film and having a refractive index of 1.1 to 1.45, wherein the first thermoplastic resin is a polyester comprising ethylene-2,6-naphthalene dicarboxylate in an amount of 95 mol % or more of the total of all the recurring units and has a melting point of 260 to 270° C. and the second thermoplastic resin is a copolyester containing 75 to 97 mol % of ethylene-2,6-naphthalene dicarboxylate and 25 to 3 mol % of ethylene terephthalate and/or ethylene isophthalate based on the total of all the recurring units and has a melting point of 210 to 255° C. and 15 to 60° C. lower than the melting point of the first thermoplastic resin; (B) the average reflectance of a polarization component parallel to the plane including the stretching direction of the monoaxially oriented laminated film and a direction perpendicular to the film plane being 90% or more at a wavelength of 400 to 800 nm, and the average reflectance of a polarization component perpendicular to the plane including the stretching direction of the film and the direction perpendicular to the film plane being 10% or less at a wavelength of 400 to 800 nm; and (C) the film having a thickness change rate of less than 5% being used in a reflective polarizing plate.

6. A process for manufacturing a monoaxially oriented multi-layer laminated film, comprising the steps of:
    forming a sheet by assembling together 501 or more layers of a first thermoplastic resin having a melting point of 260 to 270° C. and a second thermoplastic resin having a melting point of 210 to 255° C. and 15 to 60° C. lower than the melting point of the first thermoplastic resin alternately,
wherein the first thermoplastic resin is a polyester comprising ethylene-2,6-naphthalate dicarboxylate in an amount of 95 mol % or more of the total of all the recurring units and the second thermoplastic resin is a copolyester containing 75 to 97 mol % of ethylene-2,6-naphthalene dicarboxylate and 25 to 3 mol % of ethylene terephthalate and/or ethylene isophthalate based on the total of all the recurring units;
    stretching the obtained sheet in any one of a take-up direction and a cross direction at an area draw ratio of 2 to 10 times; and
    heating the stretched sheet at a temperature between a temperature 10° C. lower than the melting point of the second thermoplastic resin and a temperature 15° C. lower than the melting point of the first thermoplastic resin to form the monoaxially oriented multi-layer laminated film of claim 1.

7. The monoaxially oriented multi-layer laminated film according to claim 2, wherein the difference between the maximum reflectance and the minimum reflectance at a wavelength of 400 to 800 nm of a polarization component perpendicular to the plane including the stretching direction of the film and the direction perpendicular to the film plane is 10% or less.

* * * * *